United States Patent [19]

Royner et al.

[11] Patent Number: 5,436,824
[45] Date of Patent: Jul. 25, 1995

[54] INRUSH CURRENT LIMITER IN A MAGNETIC FLOWMETER

[75] Inventors: Bruce D. Royner, Eden Prairie; Thomas P. Coursolle, St. Paul, both of Minn.

[73] Assignee: Rosemount Inc., Eden Prairie, Minn.

[21] Appl. No.: 988,716

[22] Filed: Dec. 10, 1992

[51] Int. Cl.$^6$ ............................................. H02M 7/04
[52] U.S. Cl. ........................................ 363/89; 323/277; 323/908; 361/91
[58] Field of Search ............... 323/901, 908, 277, 278; 363/53, 49, 89; 361/58, 86, 87, 90, 91

[56] References Cited

U.S. PATENT DOCUMENTS

| | | | |
|---|---|---|---|
| 3,935,527 | 1/1976 | Michelet et al. | 321/11 |
| 3,996,506 | 12/1976 | Kichak | 323/908 |
| 4,396,882 | 8/1983 | Kellenbenz | 323/279 |
| 4,459,867 | 7/1984 | Murray et al. | 73/861.12 |
| 4,719,553 | 1/1988 | Hinckley | 363/49 |
| 4,741,215 | 5/1988 | Bohn et al. | 73/861.12 |
| 4,916,381 | 4/1990 | Gelecinskyj et al. | 323/285 |
| 5,010,293 | 4/1991 | Ellersick | 323/278 |
| 5,079,957 | 1/1992 | Wehrs | 73/861.17 |
| 5,087,871 | 2/1992 | Losel | 323/299 |
| 5,122,724 | 6/1992 | Criss | 323/222 |
| 5,187,653 | 2/1993 | Lorenz | 363/89 |

FOREIGN PATENT DOCUMENTS

| | | |
|---|---|---|
| 0423885A1 | 10/1990 | European Pat. Off. . |
| 63-64524 | 9/1986 | Japan . |

OTHER PUBLICATIONS

"Non–incendive Electrical Equipment for Use in Class 1, Division 2 Hazardous Locations"—Industrial Products Published in Mar. 1987, pp. 2–27.
"Magnetic Flowmeter Fundamentals"—by Rosemount Aug. 1989 pp. 2–8.
"Model 8712C Magnetic Flowmeter Transmitter"—by Rosemount Sep. 1990 pp. 2–8.

*Primary Examiner*—Thomas M. Dougherty
*Assistant Examiner*—Adolf Berhane
*Attorney, Agent, or Firm*—Westman, Champlin & Kelly

[57] ABSTRACT

An AC powered field mounted process control transmitter includes an inrush current limiter which prevents excessive current flow to other circuitry in the transmitter. The transmitter senses a physical parameter, such as flow, and comprises a source of current, a current driven sensing circuitry, the inrush current limiter and measurement electronics for converting the sensed parameter into a transmitter output. The limiter includes a reference voltage source and is in series between the current source and the current driven sensing circuitry. When inactive (i.e. not limiting current), the limiter responds to the series current through itself so that when such current exceeds a predetermined maximum level the limiter becomes active and prevents further current flow. The limiter remains active until the voltage across itself is less than the reference voltage, at which time the limiter becomes inactive.

21 Claims, 4 Drawing Sheets

INRUSH CURRENT LIMITER IN A MAGNETIC FLOWMETER

BACKGROUND OF THE INVENTION

The present invention relates to an AC powered field mounted process control transmitter, such as a magnetic flowmeter or a coriolis flowmeter for sensing fluid flow. More particularly, the present invention relates to an inrush current limiter for use in such a field mounted transmitter.

A magnetic flowmeter is a segment of pipe which measures the velocity of a fluid passing through it. The flowmeter creates a magnetic field in the fluid which induces an electric field in the fluid. The size of the electric field induced in the fluid is proportional to the velocity of the fluid through the pipe. By measuring the induced electric field, the magnetic flowmeter measures the velocity of the fluid flowing through the pipe. The flowmeter creates the magnetic field by passing a current through coils encircling a pipe through which conductive fluid flows. The magnitude of the field is given by Ampere's Law and is perpendicular to the flow of fluid through the pipe. Two electrodes flush-mounted on opposite sides of the flow pipe measure the electric potential induced in the fluid. An AC powered magnetic flowmeter converts an AC voltage source to a DC voltage source in order to power internal circuitry. Typically, the magnetic flowmeter uses a rectifying bridge to rectify the voltage and a capacitor to smooth the rectified AC signal in order to create a DC power source. The filter capacitor usually has a large capacitance to remove unwanted ripple.

The size of the capacitor has created a problem when the AC power source is interrupted. For short interruptions the capacitor will remain charged and normal operation will resume as soon as the AC input is resumed. However, for long interruptions of AC power, the filtering capacitor will discharge. When AC power is resumed, the capacitor draws a large amount of current as it recharges. This inrush of current can activate circuit breakers, and have damaging effects on the rest of the magnetic flowmeter's circuits.

Methods of inrush current limiting include use of a thermistor to sense and limit current. This method inherently creates excessive heat which is not compatible with explosion proof requirements commonly used in the process control industry. Other methods typically use a SCR and dissipate excessive amounts of power even when the limiting feature is inactive.

SUMMARY OF THE INVENTION

The present invention is an AC powered field mounted process control transmitter having an inrush current limiter. The transmitter senses a physical parameter, such as flow, and comprises a source of current, a current driven sensing means, an inrush current limiter and measurement electronics for converting the sensed parameter into a transmitter output. The inrush current limiter limits the amount of current which can be drawn by subsequent circuitry. The limiter includes a reference voltage and is electrically in series between the power source and the current driven sensing means. The limiter senses the current through itself when it is inactive (not limiting current) and senses the voltage across itself when it is active. When inactive, the limiter responds to the series current through itself so that when such current exceeds a predetermined maximum level the limiter becomes active and prevents further current flow. Once active, the limiter senses the voltage across itself so that when the voltage there across is less than the reference voltage the limiting means becomes active and conducts current.

DETAILED DESCRIPTION OF THE PREFERRED EMBODIMENTS

Figure 1:
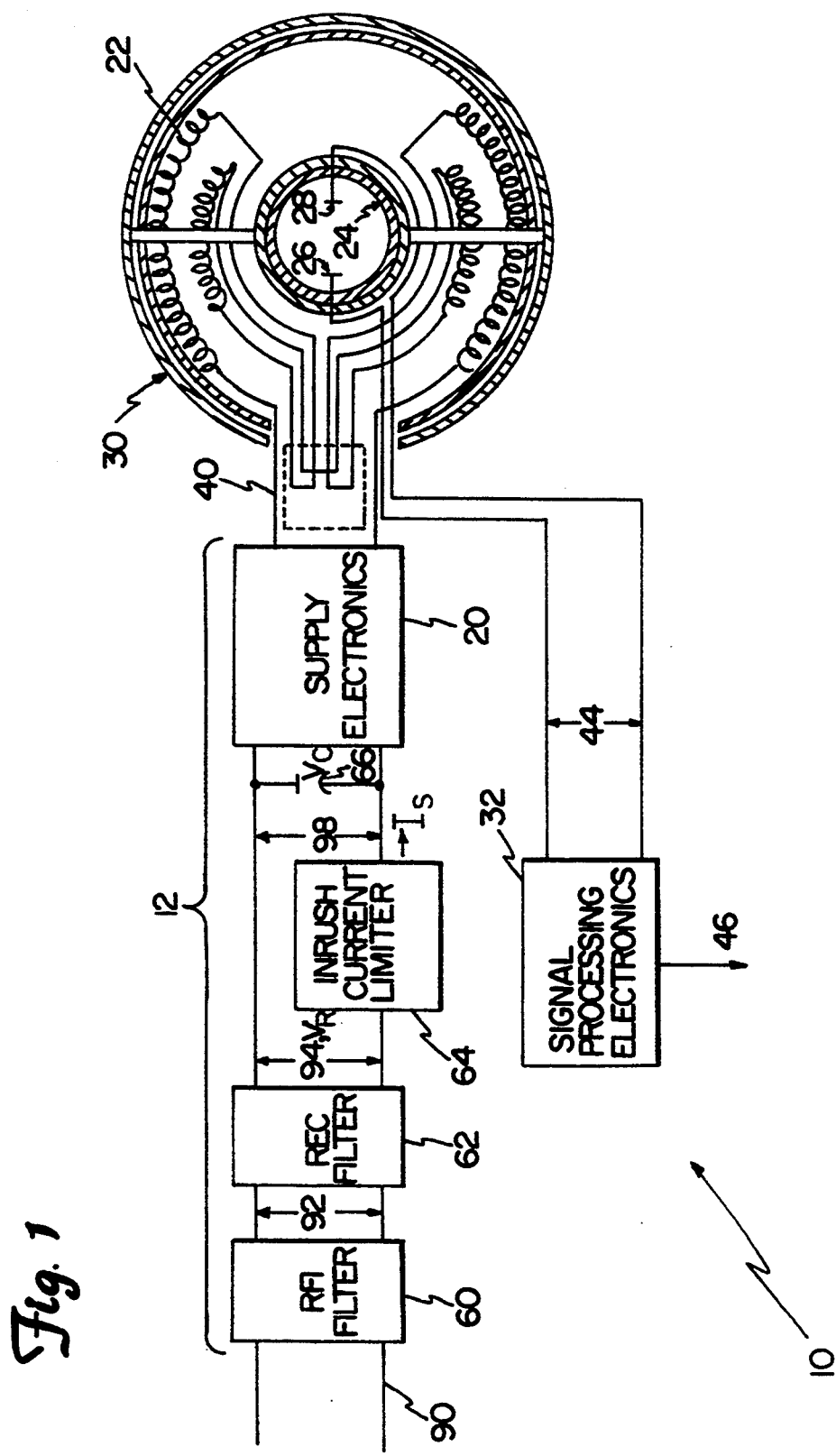
FIG. 1 is a block diagram and a sectional view of a magnetic flowmeter.

FIG. 1 shows an AC powered field mounted instrument, here shown generally at 10 as a magnetic flowmeter, comprising a transmitter 12 and a flow tube 30. RFI filter 60 in transmitter 12 receives AC power signal 90 and produces filtered AC signal 92. Full wave rectifier 62 receives filtered AC 92 and outputs full wave rectified power signal 94. Inrush current limiter 64 is coupled between full wave rectifier 62, filter capacitor 66 and supply electronics 20.

Full wave rectifier 62 provides a periodically interrupted source of current which is substantially zero at regular intervals. Either a half or full wave rectified signal meets this requirement. Inrush current limiter 64 receives full wave rectified power signal 94 and produces current limited signal $I_S$. Filter capacitor 66 receives current limited signal $I_S$ and outputs DC signal 98 to supply electronics 20 for providing coil drive signal 40 to inductance coil 22.

Figure 2:
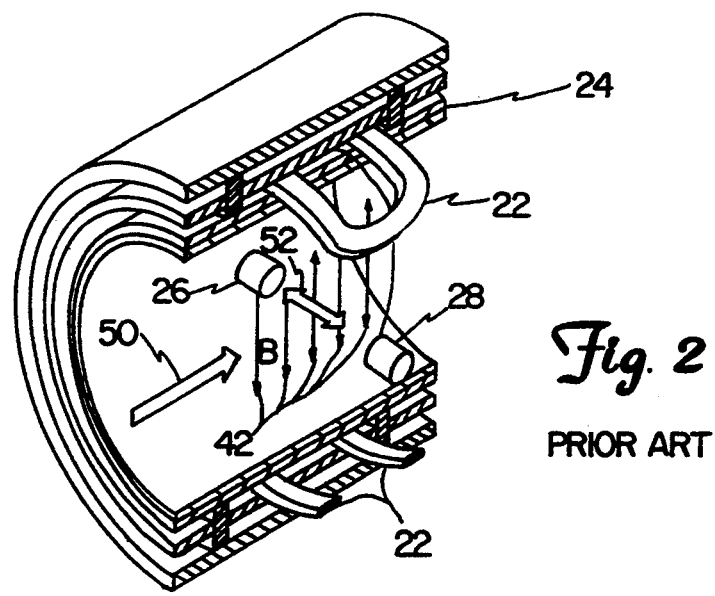
FIG. 2 is a sectional view of a flow tube.

FIG. 2 is a sectional view of flow tube 30. Coil 22 encircles non-conductive sleeve 24 and produces magnetic field 42 according to Ampere's Law. Conductive fluid 50 flows through open-ended cylinder sleeve 24 which houses electrodes 26 and 28. Signal 44 is representative of the difference in potential between electrodes 26 and 28 and is proportional to the magnitude of electric field 52. The magnitude of the field 52 is proportional to the velocity at which fluid 50 flows. Signal 44 is provided to signal processing electronics 32 for amplification and filtering of unwanted frequency components to provide output signal 46 representative of the velocity of fluid 50. Magnetic field 42 is created by inductor coils 22 and is perpendicular to fluid flow 50. Electric field 52 is perpendicular to fluid flow 50 and magnetic field 42. Electronics for driving the coils of flowmeters are discussed in U.S. Pat. No. 4,916,381, titled Current Source for a Variable Load with an Inductive Component and assigned to the same assignee as the present invention.

Figure 3:
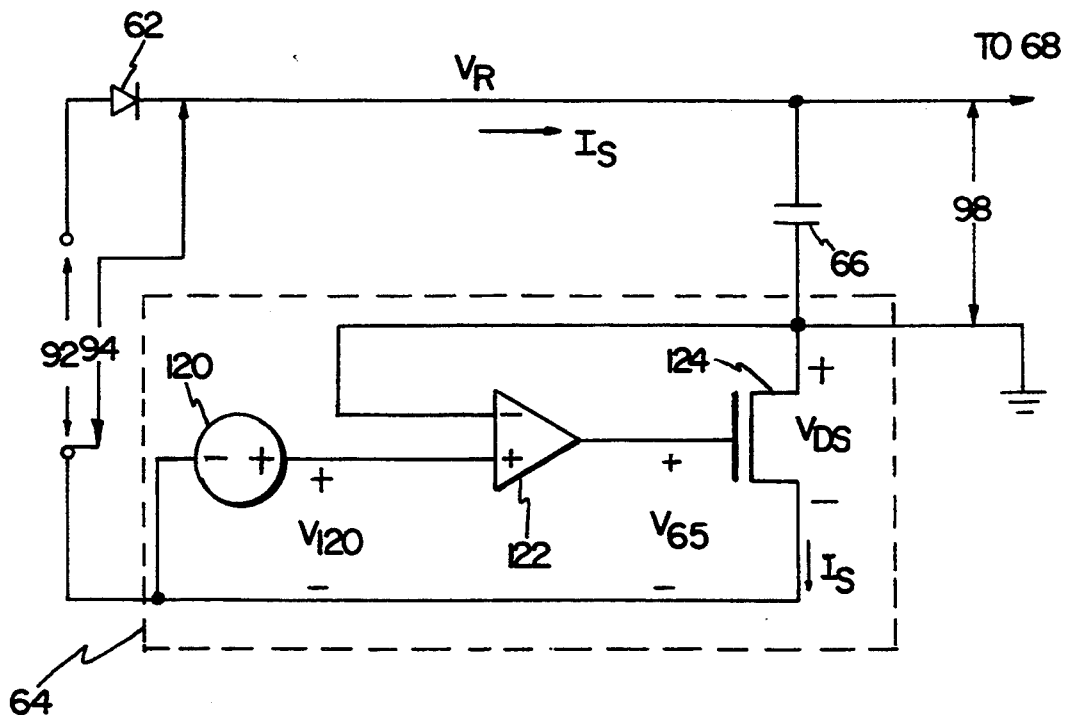
FIG. 3 is an ideal circuit diagram of the inrush current limiter of FIG. 1.
Figure 4A:
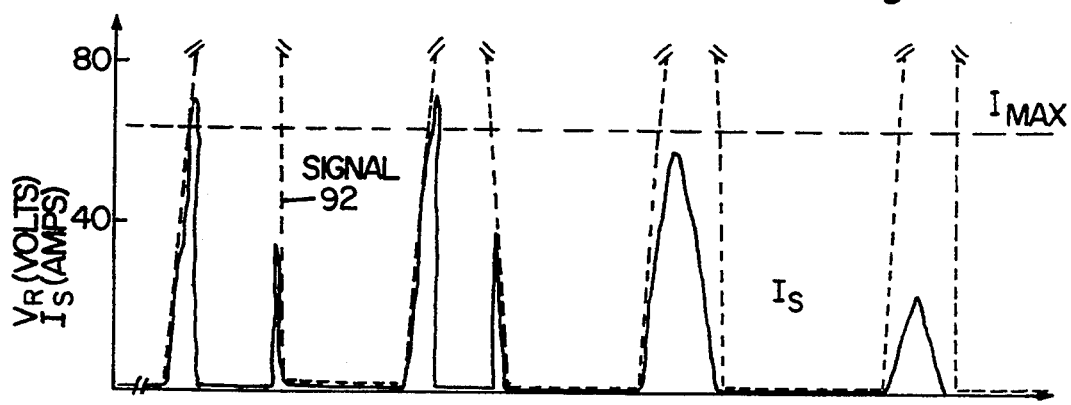
FIGS. 4A–4D are graphs of signal waveforms of the circuit of FIG. 3.
Figure 4B:
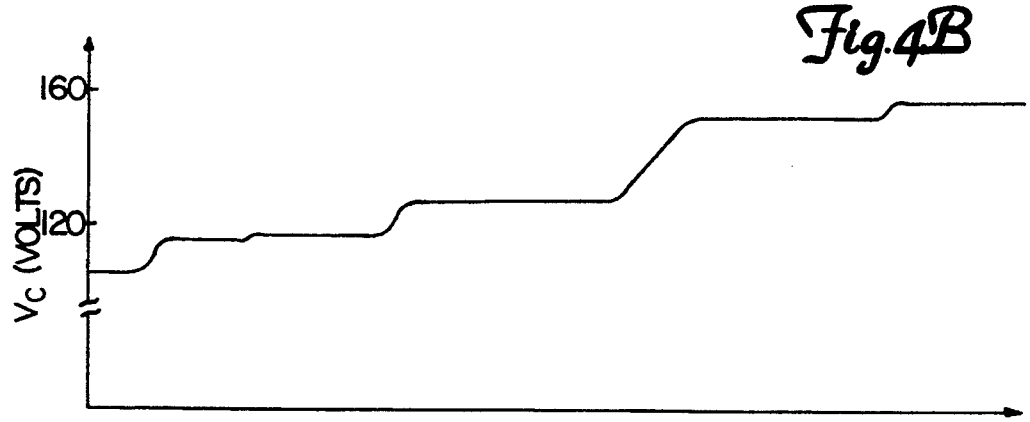
Figure 4C:
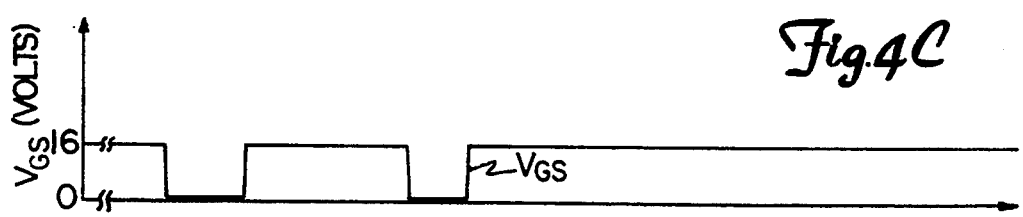
Figure 4D:
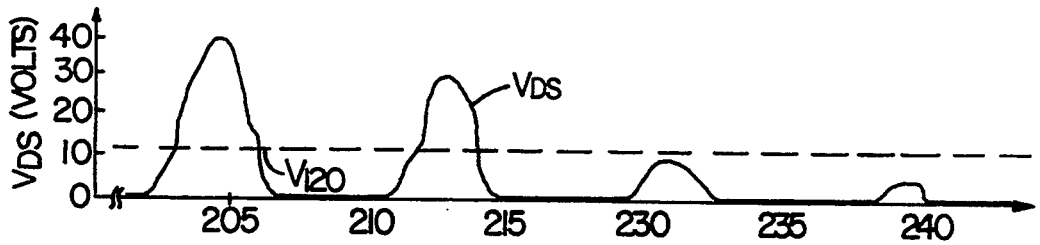

FIG. 3 shows a series connection of inrush current limiter 64, filter capacitor 66 and rectifier 62. Rectifier 62 receives AC signal 92 and provides rectified AC signal 94 to filter capacitor 66 through inrush limiter 64. Filter capacitor 66 generally has a large capacitance so as to reduce ripple. With no power applied, FET 124 is ON because error amplifier 122 provides a large enough positive voltage $V_{GS}$ to cause the FET to turn ON. During a normal power cycle, series current $I_S$ increases until it induces a resistively induced potential difference across the source drain resistance of FET 124, ($R_{DS}$), large enough to substantially equal to $V_{120}$, the potential difference across source 120. The maximum current $I_{MAX}$ is given by:

$$I_{MAX} = \frac{V_{120}}{R_{DS}}$$

At this time, the output of amp 122 has decreased so as to increase $R_{DS}$, which causes the source-drain voltage of FET 124, $V_{DS}$, to increase until this positive feedback quickly snaps FET 124 OFF. When FET 124 is OFF, limiter 64 is active and is limiting current $I_S$ to substantially zero. In summary, when limiter 64 is inactive (and FET 124 is therefore ON), limiter 64 continuously senses series current $I_S$ until a maximum current $I_{MAX}$ is reached, at which time FET 124 turns OFF and limiter 64 becomes active so as to limit current $I_S$ to substantially zero.

Limiter 64 remains active and switches to the inactive state when the voltage across itself is lower than a reference voltage. In a normal power cycle, the potential of the bridge circuit, $V_R$, reaches a maximum magnitude and starts returning to its minimum voltage. Limiter 64 switches to the inactive state when:

$$V_{DS} \leq V_{120}$$

At this switchpoint, $V_{DS}$ is less than $V_{120}$ so that amp 122 provides a positive enough output at $V_{GS}$ to turn FET 124 ON. Once FET 124 is ON, transistor action lowers $R_{DS}$ by at least an order of magnitude and FET 124 is capable of conducting current.

FIG. 4 shows waveform sketches of $V_{DS}$, $V_{GS}$, $I_S$, and the potential difference across capacitor 66, $V_C$, for four cycles. Limiter 64 cycles active/inactive during the first two cycles. The dotted line in Graph A shows half wave rectified signal $V_R$ and the solid line shows current $I_S$. Series current $I_S$ follows $V_R$ to rise from zero to $I_{MAX}$ and then abruptly fall to substantially zero and remains there until $V_R$ is less than reference voltage $V_{120}$. Graph B shows how $V_C$ increases with each cycle, during which a controlled amount of charge is transferred onto capacitor 66 when current $I_S$ is non-zero. When $V_R$ returns to zero, FET 124 remains ON and limiter 64 is inactive. Limiter 64 acts as a current sensor when inactive. As the magnitude of signal 92 increases, current $I_S$ increases until it exceeds $I_{MAX}$, when FET 124 is rapidly snapped off and $V_{GS}$ accordingly drops to substantially zero as shown in Graph C. Now limiter 64 senses the magnitude of the potential across itself, and when such potential difference is less than $V_{120}$, limiter 64 conducts current $I_S$ again.

The last two cycles of FIG. 4 detail steady state operation of limiter 64, when capacitor 66 is fully charged and limiter 64 is OFF. Graph A read together with Graph C show that when current $I_S$ remains less than $I_{MAX}$, $V_{GS}$ remains large enough so that FET 124 remains ON. Potential $V_{DS}$ shown in Graph D is a substantially resistively induced potential difference having a magnitude dependent on $I_S$.

Figure 5:
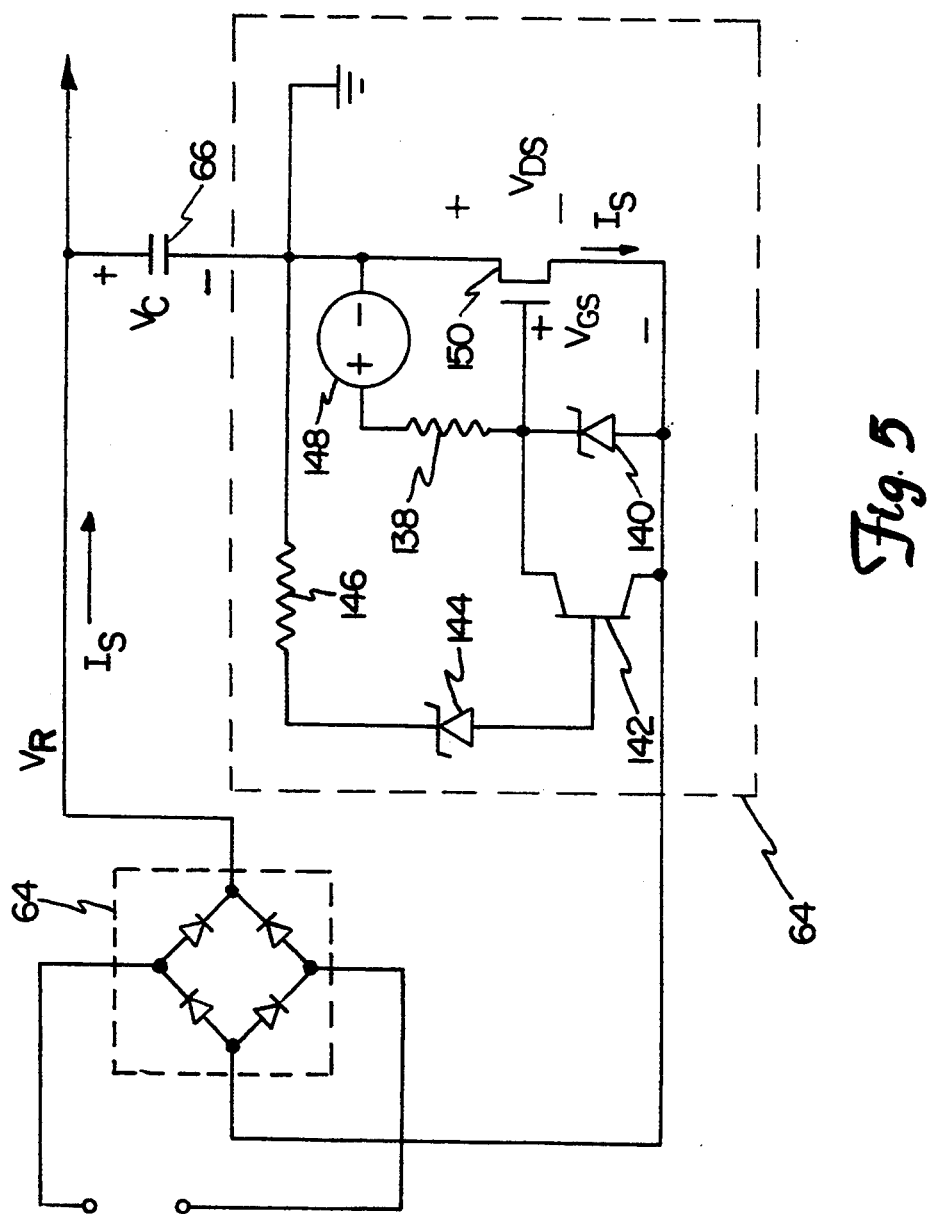
FIG. 5 is a more detailed circuit diagram of inrush current limiter of FIG. 3.

FIG. 5 is a more detailed circuit diagram of the circuit shown in FIG. 3. The function provided by reference 120 is substantially equivalent to that provided by zener 144. The function of error amplifier 122 is essentially provided here by the series combination of resistor 146, zener diode 144 and bipolar transistor 142. The value of resistor 146 and the breakdown voltage of zener 144, $V_Z$, are selected so as to provide enough current to turn bipolar transistor 144 ON at a predetermined value of $V_{DS}$.

Before power is applied, there is no voltage across the combination of capacitor 66 and FET 150, so that the base-emitter potential difference of transistor 142 ($V_{BE}$) is also effectively zero and transistor 142 is OFF. Voltage supply 148 provides a large enough potential $V_{GS}$ so that FET 150 is ON. A series circuit is formed by the on resistance of FET 150 ($R_{DS}$), bridge 62 and capacitor 66. Series current $I_S$ increases to a maximum current $I_{MAX}$, given by:

$$I_{MAX} = \frac{V_Z + V_{BE}}{R_{DS}}$$

At this level of current, transistor 142 turns ON and current begins to flow through resistor 138 which lowers $V_{GS}$ of FET 150 and causes $R_{DS}$ to increase. The increased $R_{DS}$ causes $V_{DS}$ to increase which causes transistor 142 to conduct even more current and further increases the resistance of FET 150. The positive feedback continues until FET 150 is rapidly turned OFF and dissipates substantially no power. Once FET 150 is OFF, limiter 64 is active and limiting $I_S$, so as to protect subsequent instrument circuits.

When $V_R$ is lower than a voltage threshold $V_Z + V_{BE}$, FET 150 turns ON to conduct current $I_S$. FET 150 conducts current until $I_S$ exceeds $I_{MAX}$, which will occur in the next power cycle. Since $V_R$ returns to substantially zero volts each cycle, limiter 64 resets automatically on a cycle by cycle basis.

Cycling FET 150 ON and OFF continues until the voltage difference across capacitor 66 is large enough such that transistor 142 never turns ON and therefore FET 150 never turns OFF. This method allows efficient current flow during normal operation of the flow meter and prevents excessive heat dissipation during current limiting operation of the flowmeter. With this minimal power consumption brought about by the present invention, flowmeters with the present current limiter are used in hazardous locations and are given approval by various process control industry standards organizations. One example of such a standard is CAN/CSA-C22.2 No. 213-M1987 Non-incendive Electrical Equipment for Use is Class I, Division 2 Hazardous Locations, which specifies the power and heat dissipation requirements for equipment in hazardous locations.

FET 124 operates like a digital switch in that $R_{DS}$ resistively dissipates an extremely small amount of power because $R_{DS}$ is approximately a few tenths of an ohm and because the series current is essentially zero when limiter 64 is actively limiting current. The extremely small ON resistance of FET 124 is critical, since previous limiting methods have excessive resistance which needlessly dissipates power. Because the active element in limiter 64 is OFF when the limiter is actively limiting the current, substantially no resistive power is dissipated when the limiter is active. Limiter 64 effectively dissipates power only when switching between states and as such, is different than SCRs and thermistor which both have the active element turned ON and resistively dissipate significant power when actively limiting current. The minimal power consumption of the present invention allows use of these flowmeters in explosion proof environments commonly found in process control environments.

SCR current limiters typically use a resistor to initially charge the filter capacitor. The charging current produces a voltage drop across the resistor, which is monitored by a comparator circuit. When the voltage across the resistor is less than a reference voltage for a period of time set by a time constant internal to the circuit, the SCR is allowed to turn on and shunt the resistor, reducing the voltage drop to the on-state voltage of the SCR. The on-state voltage of an SCR is approximately 1 volt, causing a power dissipation of several watts for typical current levels. Because the SCR is a latching type of device, once the SCR is turned on it can no longer react to rapid current or voltage changes to protect the power supply circuitry.

Thermistor current limiters conduct the entire current which is to be limited through the thermistor. Inrush current is initially limited by the thermistor's high resistance until a critical temperature is reached, after which the thermistor decreases its resistance. Thermistor limiters have poor reset capability because of the significant thermal time constant required to cool them down to a level where they can again be activated, and so react poorly to fast transients in voltage and current.

Limiter 64 protects against excessive input current spikes and short term sharp current and voltage transients once filter capacitor 66 is fully charged, when limiter 64 is inactive and in steady state. As discussed, when inactive, limiter 64 senses current through itself to switch to the active state and once in the active state, senses voltage across itself to switch back to the inactive state. When excessive current is applied to the inactive limiter 64, it senses current and switches to the active state immediately when the input current exceeds a maximum current. Both SCR and thermistor based limiters respond poorly to current spike situations and short term power outages.

What is claimed is:

1. An AC powered field mounted process control transmitter for sensing a physical parameter, comprising:
   rectification means for rectifying the AC power;
   a current driven sensing means for sensing the physical parameter;
   limiting means in series between the rectifier and the current driven sensing means and having a reference voltage therein, the limiting means switching from an inactive state to an active state when the current therethrough exceeds a maximum current and switching back to the inactive state when the voltage across the limiting means is lower than the reference voltage.

2. The transmitter of claim 1 wherein the limiting means includes a FET having an ON resistance lower than ten ohms.

3. The transmitter of claim 1 where the limiting means has an on resistance and the maximum current is related to a ratio of the voltage reference and the on resistance.

4. The transmitter of claim 1 where the limiting means includes a comparator.

5. The transmitter of claim 1 where the reference voltage includes a zener diode.

6. A magnetic flowmeter powered by an external voltage source and having a current limiter in series between the source and circuitry in the flowmeter, the source providing a rectified voltage having repeated voltage minimums and maximums, the current limiter comprising: variable impedance means for providing an output impedance of the limiter, having a high impedance OFF state and a low impedance ON state, the variable impedance means transitioning from the ON state to the OFF state when the current through the variable impedance means exceeds a critical current; and control means for transitioning the variable impedance means from the OFF state to the ON state when a voltage across the variable impedance means is less than a threshold voltage.

7. The magnetic flowmeter of claim 6 where the variable impedance means comprises a transistor.

8. The magnetic flowmeter of claim 6 wherein the voltage reference comprises a zener diode.

9. The magnetic flowmeter of claim 6 wherein the variable impedance means has an ON resistance and the predetermined current level is related to a ratio of the voltage reference and the ON resistance.

10. The magnetic flowmeter of claim 6 wherein the control means includes a comparator.

11. An inrush current limiter for limiting inrush current to a magnetic flowmeter comprising:
    first and second AC inputs for coupling to a rectified AC power source;
    first and second power outputs for coupling to the magnetic flowmeter, the first power output coupled to the first AC input;
    a capacitor having a first plate coupled to the first power output and a second plate coupled to the second power output;
    a FET having a drain coupled to the second power output, a source coupled to the second AC input and a gate;
    a comparator having an output coupled to the gate of the FET, a first input coupled to the second power output and a second input; and
    a voltage reference coupled between the second input of the comparator and the second AC input;
    wherein only a series electrical connection having a single path is between the inrush current limiter and the magnetic flowmeter.

12. The inrush current limiter of claim 11 wherein the comparator includes a bipolar junction transistor.

13. The inrush current limiter of claim 11 wherein the voltage reference comprises a zener diode.

14. An AC powered magnetic flowmeter for use in a hazardous location, comprising:
    rectification means receiving the AC power for providing a rectified current;
    voltage storage means receiving the rectified current and having a potential difference thereacross, for providing such voltage to circuitry in the flowmeter;
    current limiting means responsive to the current through the voltage storage means, for limiting such current to a predetermined level; and
    a single series electrical path connects the current limiting means and the circuitry in the flowmeter.

15. The magnetic flowmeter of claim 14 wherein the current limiting means switches between an active state and an inactive state in response to the current, through the voltage storage means.

16. The magnetic flowmeter of claim 14 wherein the current limiting means includes a FET having an on resistance lower than ten ohms.

17. The magnetic flowmeter of claim 14 wherein the current limiting means includes a comparator.

18. A magnetic flowmeter, comprising:

rectification means, receiving an interruptable source of AC power having rapid on-off transients, for providing a rectified current;

voltage storage means receiving the rectified current, the rectified current surging when the AC power turns on; and current limiting means responsive to the current through the voltage storage means, for limiting such current upon reinstatement of AC power wherein the current limiting means switches from an inactive state to an active state in response to the current through the voltage storage means and switches from the active state to the inactive state in response to a voltage across the voltage storage means.

19. The magnetic flowmeter of claim 18 wherein the current limiting means is in series with the rectification means and the circuitry in the flowmeter.

20. The magnetic flowmeter of claim 18 wherein the current limiting means includes a FET having an on resistance lower than ten ohms.

21. The magnetic flowmeter of claim 18 wherein the current limiting means includes a comparator.

* * * * *

UNITED STATES PATENT AND TRADEMARK OFFICE
CERTIFICATE OF CORRECTION

PATENT NO. : 5,436,824
DATED : July 25, 1995
INVENTOR(S) : Bruce D. Rovner and Thomas P. Coursolle It is certified that error appears in the above-indentified patent and that said Letters Patent is hereby corrected as shown below:

Under [75] and [19] Inventors; delete "Royner" and insert --Rovner--.

Signed and Sealed this

Sixteenth Day of January, 1996

Attest:

BRUCE LEHMAN

Attesting Officer

Commissioner of Patents and Trademarks